US008067856B2

(12) United States Patent
Carter et al.

(10) Patent No.: US 8,067,856 B2
(45) Date of Patent: Nov. 29, 2011

(54) POWER MANAGEMENT SYSTEM (75) Inventors: Bill Carter, Olympia, WA (US); Brian Griffith, Auburn, WA (US); Viktor Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 12/231,597

(22) Filed: Sep. 4, 2008

(65) Prior Publication Data

US 2010/0052426 A1    Mar. 4, 2010

(51) Int. Cl.
*H02J 9/02* (2006.01)

(52) U.S. Cl. ........................................................ 307/66
(58) Field of Classification Search .............. 307/64–66; 713/310; 700/292, 293
See application file for complete search history.

(56) References Cited

U.S. PATENT DOCUMENTS

| 4,675,538 | A  | * | 6/1987  | Epstein .......................... 307/64 |
| 5,347,164 | A  | * | 9/1994  | Yeh ................................. 307/66 |
| 6,114,775 | A  | * | 9/2000  | Chung et al. ................ 307/10.1 |
| 7,564,148 | B2 | * | 7/2009  | Powell ............................ 307/66 |
| 7,615,965 | B2 | * | 11/2009 | Popescu-Stanesti et al. . 320/128 |
| 2010/0077238 | A1 |   | 3/2010  | Vogman et al. |

OTHER PUBLICATIONS

Malik, R. et al., "Energy Efficiency, it's Benefits and Methods to close the Efficiency gap", IBM Research Triangle Park, NC, Poughkeepsie, NY, IEEE 2008, pp. 417-422.

\* cited by examiner

*Primary Examiner* — Albert W Paladini
(74) *Attorney, Agent, or Firm* — Glen B Choi (57) ABSTRACT

A power supply system includes at least one power supply module and at least one redundant power supply module. A power supply module may include a charging resistor in parallel with an OR-ing device to keep all filter capacitors charged as long as at least one power supply module remains operational. This may avoid current spikes at turn on and may enable the redundant module to turn on without using soft start.

20 Claims, 7 Drawing Sheets

POWER MANAGEMENT SYSTEM

FIELD

The subject matter disclosed herein relates generally to the field of power supply management.

RELATED ART

Many types of electronic devices use power supply systems to ensure that the proper output power is available for use. Many power supply systems require relatively large amounts of input and output currents when input power is first applied and power supply gets activated. Power supply systems typically use soft start circuits for the purpose of preventing destruction of circuitry due to a rush current occurring at start-up and preventing overshoot in the waveform of an output voltage as it rises. However, soft start circuits provide slow power supply startup times.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
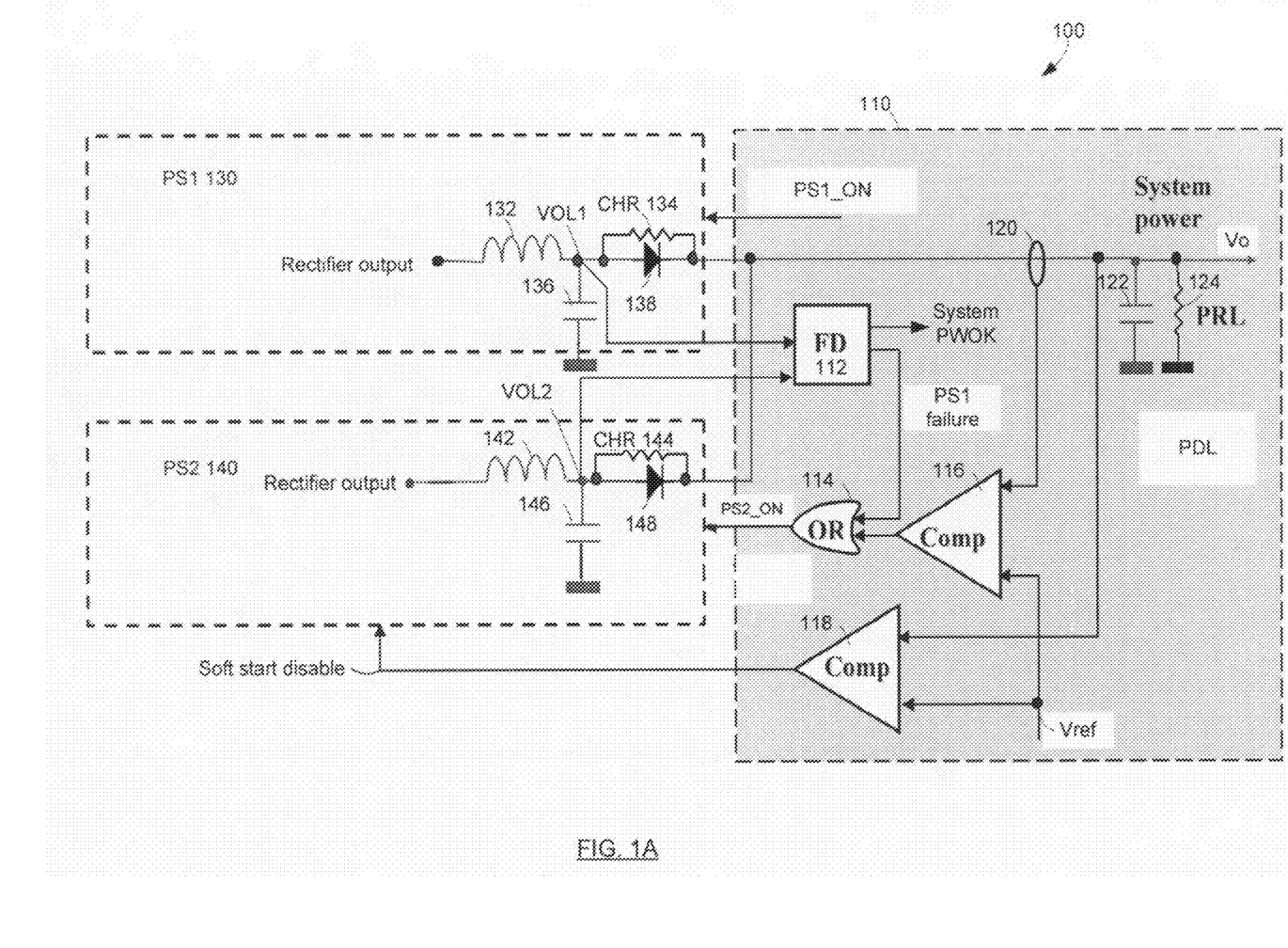
FIG. 1A depicts a functional block-diagram of a power supply system, in accordance with an embodiment of the present invention.

FIG. 1A depicts a functional block-diagram of a power supply system 100 in accordance with an embodiment of the present invention. System 100 may include power distribution logic (PDL) 110 that controls the power output of at least one power supply PS1 130 and at least one redundant power supply PS2 140. Additional power supplies can be added for control by PDL 110. PDL 110 controls whether one or both of PS1 130 and PS2 140 output power. Power supplies PS1 130 and PS2 140 may be implemented in substantially the same manner.

PDL 110 is capable of providing power at an output voltage terminal Vo. Current sensor 120 measures current to output terminal Vo. Comparator 116 may compare the measured current against first and second threshold values and output a control signal used to control whether power supply PS2 140 outputs power. Comparator 116 may turn off PS2 140 when the measured output current from all power supplies to terminal Vo falls below a first threshold level. Comparator 116 may turn on PS2 140 when the measured output current from all power supplies to terminal Vo rises above a second threshold level.

Power supply PS1 130 receives power supply enable signal PS1_ON whereas power supply PS2 140 receives power supply enable signal PS2_ON. Power supply enable signals control whether a power supply outputs power. For example, a computer system provides the power supply enable signal PS1_ON to cause output of power to terminal Vo.

Although not depicted, each of power supplies PS1 130 and PS2 140 includes conventional soft start logic that starts-up the power supplies. The soft start logic for power supply PS2 140 can be disabled by use of a soft start disable signal from comparator 118 of PDL 110.

Failure detector 112 may monitor the condition of the active power supplies PS1 130 and PS2 140. When an internal voltage of PS1 130 at terminal $V_{OL1}$ is below a threshold, failure detector 112 may cause assertion of signal PS2_ON to permit power supply PS2 140 to output power.

Failure detector 112 may also output signal System PWOK to indicate to a computer system that power output level is at an acceptable level. Failure detector 112 may output signal System PWOK in the active state when a voltage at terminal $V_{OL1}$ of PS1 130 is below a threshold but power supply PS2 140 outputs power to output terminal Vo. Failure detector 112 may output signal System PWOK in an inactive state when both power supplies PS1 130 and PS2 140 are inactive and the output voltage at terminal Vo is out of a regulated range. In other embodiments, logic separate from failure detector 112 may output signal System PWOK.

Each of PS1 130 and PS2 140 are capable of supplying output power to terminal Vo. The power supply outputs are connected in parallel, so the power supplies share common load. Capacitor 122 and preload resistor (PRLR) 124 are coupled to terminal Vo. Filter capacitors 136 and 146 are charged from terminal Vo as long as one power supply powers output voltage terminal Vo. Preload resistor (e.g., PRL 124) is placed on PDL 110 and OR-ing devices (e.g., diodes or MOSFETs) are bypassed with charging resistors (e.g., CHR1 134 and CHR2 144). Use of the resistors for charging filter capacitors 136 and 146 allow system 100 to avoid current spikes at redundant power supply turn-on and enables the cold redundant power supply module to turn on rapidly without using soft start.

In a hot redundant state (e.g., when PS1 130 and PS2 140 operate), charging resistors 134 and 144 are "shorted" by conducting diodes 138 and 148, so voltage drops across the charging resistors 134 and 144 are close to zero and the charging resistors 134 and 144 may not dissipate any noticeable power. In an off state (when neither PS1 130 nor PS2 140 operates) or in a cold redundant state once capacitor 146 is charged, there is no current flowing from the common bus (not shown) inside the power supply module, so the power dissipation in the charging resistors may be zero.

Figure 1B:
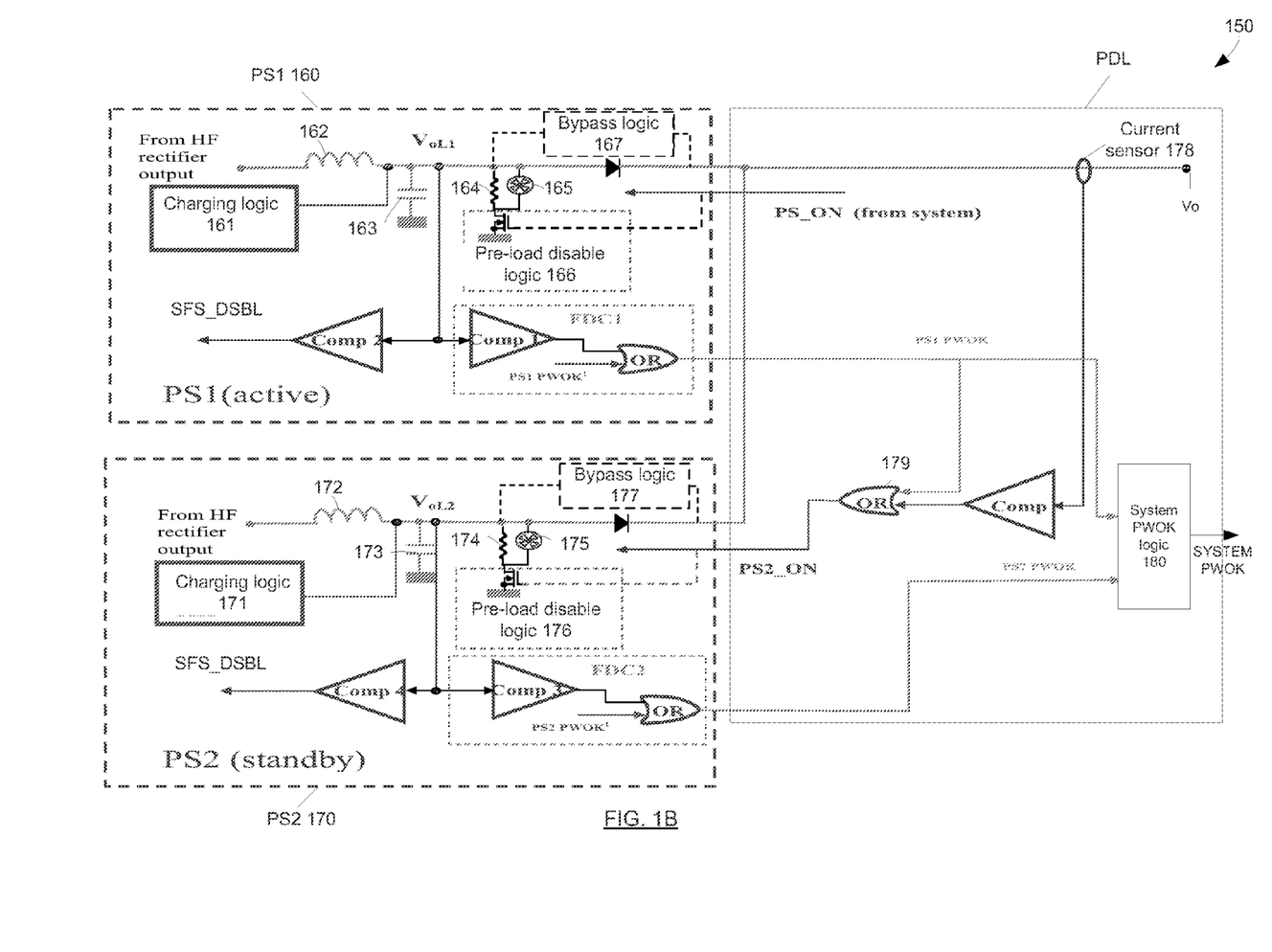
FIG. 1B depicts a functional block-diagram of another power supply system, in accordance with an embodiment of the present invention.

FIG. 1B depicts a functional block-diagram of a power supply system 150 in accordance with an embodiment of the present invention. Power supply PS1 160 operates in a similar manner as power supply PS2 170. One or more power supplies similar to power supply PS1 160 can be added to system 150.

Inductor 162 and output capacitor 163 may filter out DC content from a high frequency sequence of voltage pulses generated at the HF rectifier output.

Charging logic 161 may charge charging capacitor 163. Charging logic 161 may be implemented as a linear regulator that supplies power output of approximately 100 mW or as a housekeeping standby converter. Maintaining substantially fully charged charging capacitor 163 may allow power supply PS1 160 to start rapidly and without using soft start logic. Capacitor may alternatively be charged from the output voltage terminal Vo through bypass logic 167, similarly to the block diagram in FIG. 1A.

Pre-load disable logic 166 may disconnect preloading resistor 164 and fan 165 from a local bus (not depicted) when power supply PS1 160 is in standby mode (e.g., when input signal PS_ON is de-asserted). Disconnecting the preloading resistor 164 and fan 165 may reduce power consumption by power supply PS1 160 during charging of capacitor 163 and may permit output capacitor 163 to be charged from a very low power supply (e.g., charging logic 161) or directly from the output voltage terminal Vo through bypass logic 167. Preload disable logic 166 may be implemented as a solid state switch controlled by signal PS_ON.

Comparator Comp 2 may disable the soft start logic in power supply PS1 160 by asserting signal SFS_DSBL when internal voltage of PS1 160 at terminal $V_{oL1}$ reaches or approaches a lower regulation limit.

The following is a description of a manner to generate SYSTEM PWOK signal using PWOK signals from power supplies PS1 160 and PS2 170. Together, Comp1 and an OR logic form a fault detector FDC1 of PS1 160. FDC1 indicates to system PWOK generation logic 180 via signal PS1 PWOK that the internal voltage power supply PS1 is insufficient or its output voltage may soon go out of regulation limits. OR logic of FDC1 outputs PS1 PWOK based on inputs of the output of comparator Comp1 and an input of signal PS1 PWOK[1]. Comparator Comp1 of PS1 160 monitors a voltage at terminal $V_{OL1}$ of power supply PS1 160 and deasserts its input to OR logic of FDC1 when the voltage at terminal $V_{OL1}$ drops by approximately 2%. Signal PS1 PWOK[1] is an internal PWOK signal that is asserted when internal voltage $V_{oL1}$ is within regulation limits but is de-asserted approximately 1 ms before the voltage at terminal $V_{oL1}$ leaves regulation limits.

Similarly, comparator Comp3 and an OR logic form a fault detector FDC2 of PS2 170. FDC2 operates in a similar manner as FDC1 except the OR logic of FDC2 generates signal PS2 PWOK based on inputs of signal PS2 PWOK[1] and an output of comparator Comp 3. Signal PS2 PWOK[1] is an internal PWOK signal that is asserted when internal voltage $V_{oL2}$ is within regulation limits but is de-asserted approximately 1 ms before the voltage at terminal $V_{oL2}$ leaves regulation limits. Comparator Comp 3 deasserts its input to OR logic of FDC2 when the voltage at terminal $V_{OL2}$ drops by approximately 2%.

System PWOK generation logic 180 may indicate via signal SYSTEM PWOK whether system 150 is able to provide system power. Signal SYSTEM PWOK may assert when any of PS1 or PS2 PWOK signals is asserted or during transition time between when a primary power supply (e.g., PS1) fails and a redundant power supply (e.g., PS2) is enabled.

Figure 2:
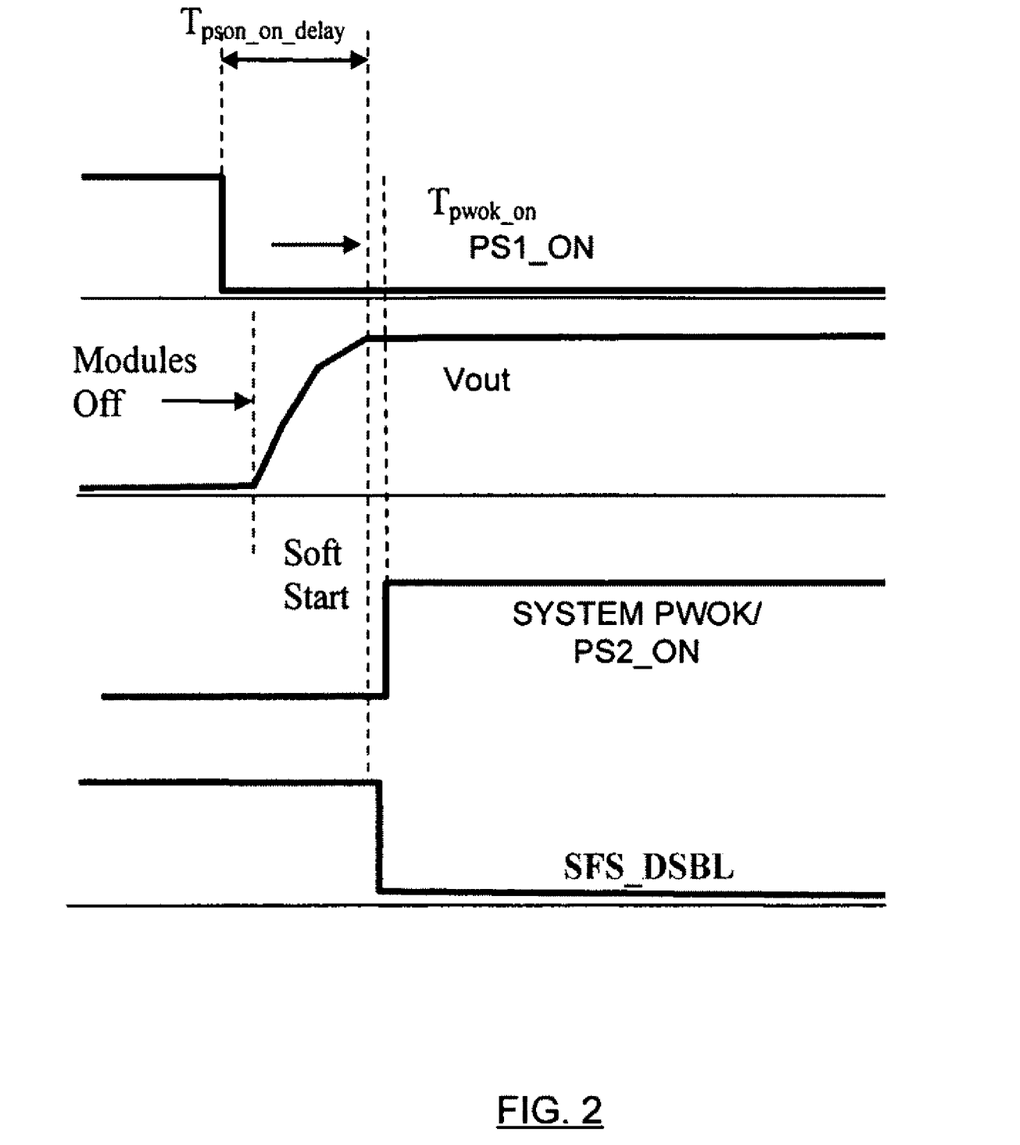
FIG. 2 depicts example signals generated during initial startup mode, in accordance with an embodiment of the present invention.

There are three major operating modes of systems 100 and 150: initial start, steady state operation, and power supply failure. FIG. 2 depicts example signals generated during the initial start mode, in accordance with an embodiment of the present invention.

The following describes operation of system 100 during initial turn on. Capacitors of the power supplies (e.g., capacitors 136 and 146) are discharged, so a recipient of power from system 100 enables power supply PS1 130 by asserting signal PS1_ON to logic zero to soft-start power supply PS1 130. Soft start circuitry gradually increases the duty cycle of voltage pulses generated at a rectifier output (filter input) terminal. As power supply PS1 130 outputs power, output capacitor 146 of power supply PS2 140 charges. When the output voltage at terminal Vo has reached its nominal level, comparator 118 causes signal SFS_DSBL to transition to logic zero and disable the soft start circuitry for power supply PS2 140. When total current detected by current sensor 120 reaches a specified threshold, comparator 116 asserts signal PS2_ON on the standby power supply PS2 140 through OR gate 114 so that power supply PS2 140 starts without using soft start. In addition, SYSTEM PWOK asserts to logic high after output voltage Vo reaches nominal level and is within regulation limit. Signal SYSTEM PWOK transitioning to logic high indicates that output power is available for consumption.

The following describes operation of system 150 during initial turn on. Capacitors of the power supplies (e.g., capacitors 163 and 173) are discharged, so the system enables power supply PS1 160 by changing signal PS_ON to logic zero to soft-start power supply PS1 160. Soft start logic gradually increases the duty cycle of voltage pulses generated at the output filter (inductor 162, capacitor 163) input. This causes voltage at terminal $V_{oL1}$ to increase gradually. As power supply PS1 160 outputs power, output capacitor 173 of power supply PS2 170 charges. Output capacitor 173 can receive power either from charging logic 172 or from internal charging logic 171. When voltage at terminal $V_{oL2}$ reaches nominal level, the soft start of PS2 170 is disabled via comparator Comp 4. When total current detected by current sensor 178 reaches a specified threshold, comparator Comp asserts signal PS2_ON through OR gate 179 so that power supply PS2 170 starts without using soft start. In addition, signal SYSTEM PWOK asserts high after output voltage at terminal Vo reaches nominal level and is within regulation limit. Signal SYSTEM PWOK transitioning to logic high indicates that output power is available for consumption.

Figure 3:
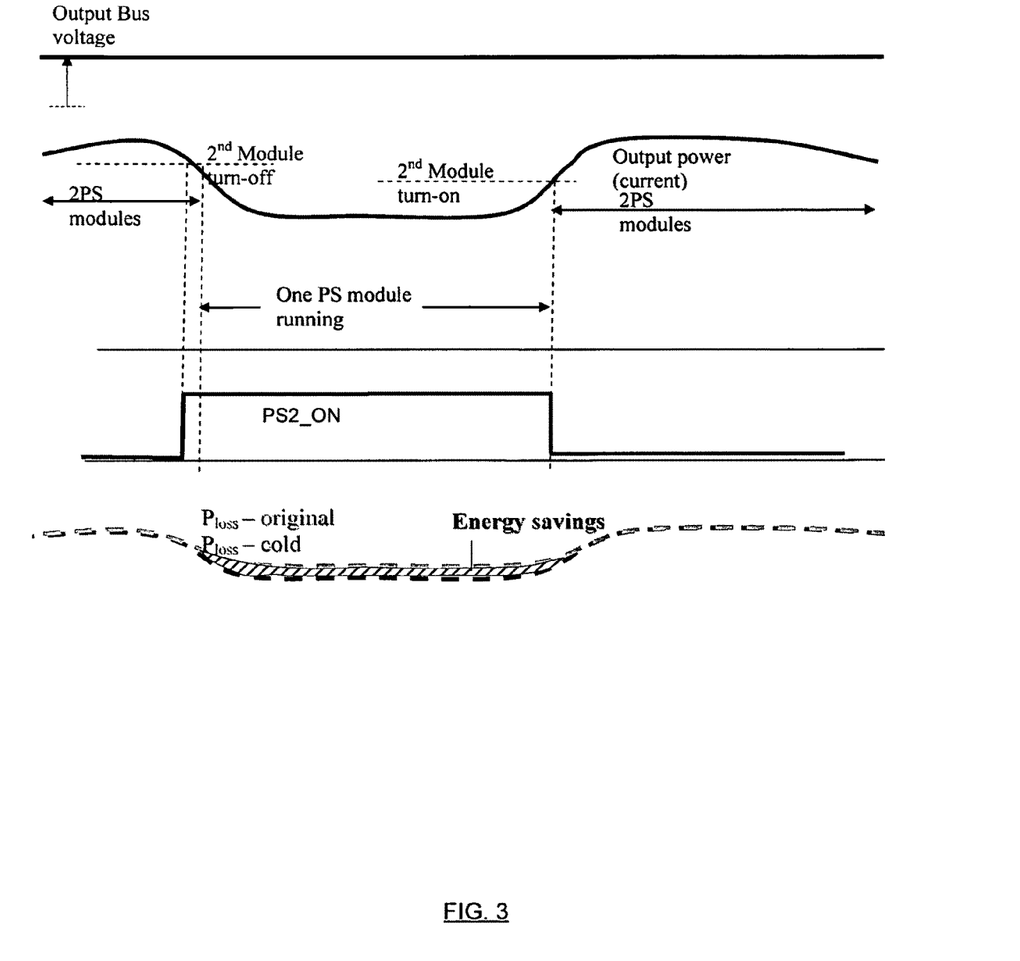
FIG. 3 depicts example signals generated during steady state operation, in accordance with an embodiment of the present invention.

FIG. 3 depicts example signals generated during steady state operation, in accordance with an embodiment of the present invention. The following describes operation of system 100 during steady state operation. The voltage at output voltage terminal Vo maintains approximately constant during the time period of this example. However, consumed power and current drawn from the power subsystem may vary in wide range. When the output current measured by current sensor 120 falls below a threshold, comparator 116 causes signal PS2_ON to de-assert by transitioning to logic one. Signal PS2_ON transitioning to logic one causes power supply PS2 140 to power off. While operating in cold redundant state, the system consumes less power because fixed losses from the one or more standby power supplies are eliminated. Because capacitor 146 of PS2 140 remains charged, standby power supply PS2 140 may be enabled, if needed, after a very short time. This allows for possible frequent transitions into and out of a cold redundant state. If total current (power) remains below specified predetermined threshold, which could be set within 20-40% of max rating, standby power supply PS2 140 may remain in the off (cold redundant) state with its output capacitor 146 charged from terminal Vo through charging resistor 144.

After total current (power) exceeds a predetermined threshold, comparator 116 causes signal PS2_ON to assert by transitioning to logic zero to power on redundant power supply PS2 140.

As depicted, energy savings results from transitioning the redundant power supply PS2 140 into cold redundant state. The energy savings of transitioning power supply PS2 140 into cold redundant state is shown as compared to energy use where power supply PS2 140 continues to run.

The operation of system 150 during steady state operation is similar to the operation of system 100. When the output current measured by current sensor 178 falls below a threshold, comparator Comp causes signal PS2_ON to de-assert by transitioning to logic one. Signal PS2_ON transitioning to logic one causes power supply PS2 170 to power off. At least because of steady state output from terminal Vo, capacitor 173 remains charged either through bypass logic 177 or from charging logic 171, the standby power supply PS2 170 may be enabled after a very short time. After total current (power) exceeds a predetermined threshold, comparator Comp causes signal PS2_ON to assert by transitioning to logic zero to power on redundant power supply PS2 170.

Figure 4A:
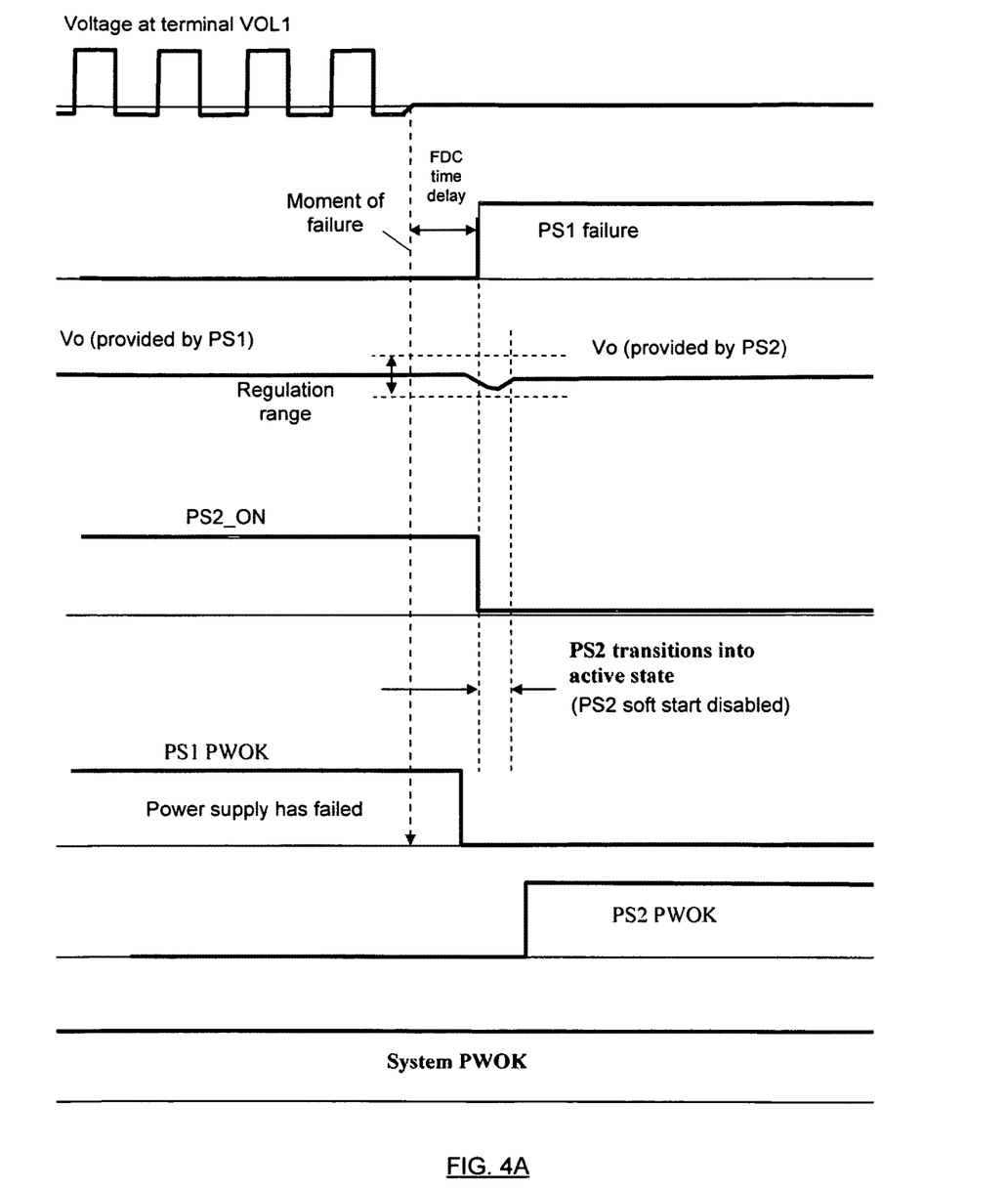
FIG. 4A depicts example signals generated during a power supply failure condition, in accordance with an embodiment of the present invention.

FIG. 4A depicts example signals generated during a power supply failure condition, in accordance with an embodiment of the present invention. The following describes operation of system 100 during a power supply failure condition. In this example FDC1 may be coupled to the output filter input, so when the active power supply PS1 fails and the pulses at rectifier output cease, failure detector 112 detects a failure within one cycle of the switching frequency of the pulses and asserts signal PS2_ON to power on the standby power supply PS2 140 through OR gate 114. The delay between failure detection and signaling the power supply PS2 140 to power on is shown as FDC time delay. Because the output voltage is at its nominal level, soft start for power supply PS2 is disabled. Accordingly, because capacitor 146 is fully charged, upon receiving signal PS2_ON, power supply PS2 starts at its max duty cycle with a minor delay. Starting of power supply PS2 with minor delay allows maintaining output voltage at terminal Vo within regulation tolerance even when primary source PS1 fails, or capacitor 136 fails into short.

Use of PWOK signals is well known in the art. PWOK signals indicate whether a power supply provides sufficient output voltage. Signal PS1 PWOK transitions to in active state after the moment of failure to indicate power supply PS1 130 is inactive. However, signal PS2 PWOK transitions to active state after the moment of failure to indicate power supply PS2 140 is active. Because of the rapid activation of power supply PS2 140, system power status signal system PWOK remains active.

Although not depicted in FIG. 1A or 4A, besides failure detector 112, the PW_OK of the active power supply could also be used as a failure detecting signal generated with 1-2 ms warning time.

The following describes operation of system 150 during a power supply failure condition. In this example, when the active power supply PS1 160 fails, the pulses at the filter input cease. FDC1 detects a failure within one cycle of switching frequency of the pulses, and de-asserts the PS1 PWOK signal to assert a signal PS2_ON from OR gate 179 to power on the standby power supply PS2 170. Because capacitor 146 is fully charged by charging logic 171 or from terminal Vo through bypass logic 172, in response to receiving the PS2_ON signal, power supply PS2 starts at its max duty cycle with a minor delay. Starting of power supply PS2 with minor delay allows maintaining output voltage at terminal Vo within regulation tolerance. An increase in the voltage at terminal $V_{OL2}$ of power supply PS2 causes FDC2 to assert signal PS2 PWOK. Signal SYSTEM PWOK stays asserted to signal that system power is available.

Figure 4B:
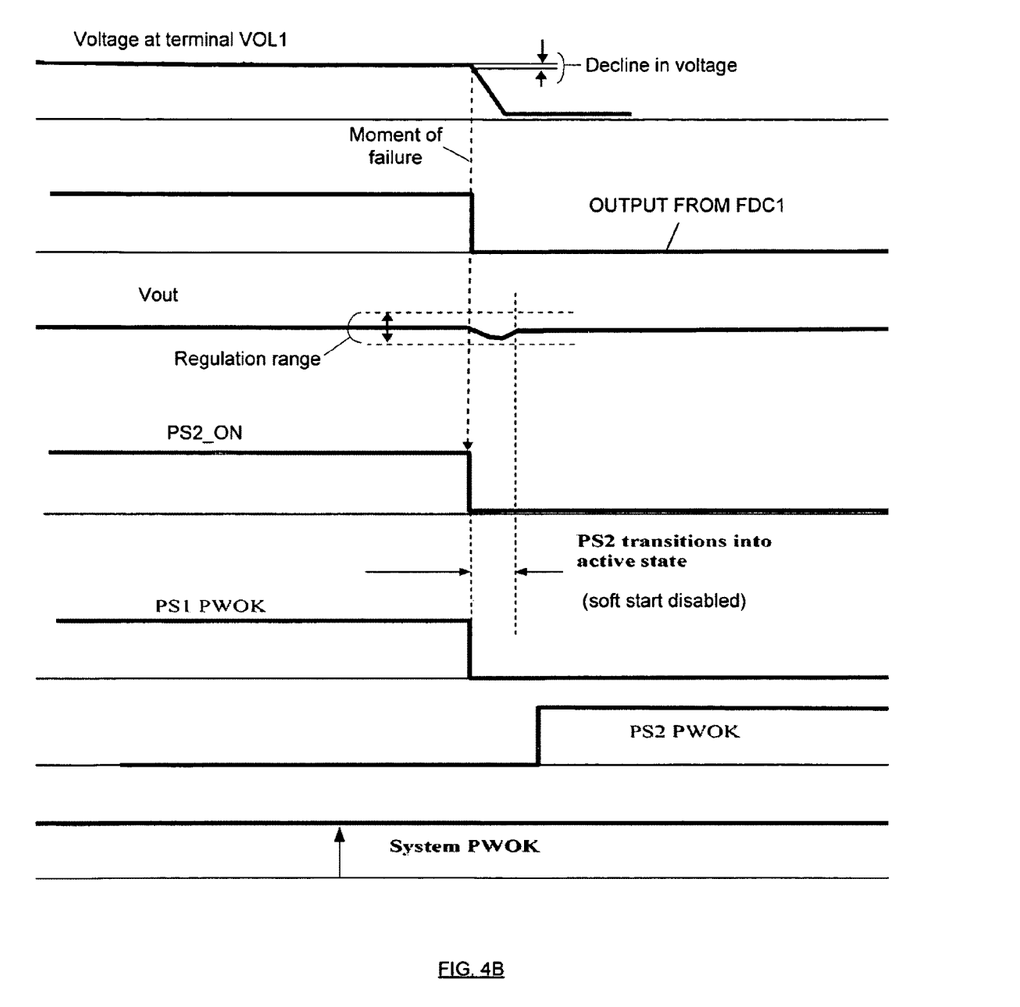
FIG. 4B depicts example signals generated during another power supply failure condition, in accordance with an embodiment of the present invention.

FIG. 4B depicts example signals generated during another power supply failure condition, in accordance with an embodiment of the present invention. This example is similar to the example of FIG. 4A, except that failure detection is based on a drop in internal voltages at terminal $V_{OL1}$ of power supply PS1 130/$V_{OL2}$ of power supply PS1 160 instead of failure to receive input pulses. When the active PS fails (e.g., PS1) and its internal output voltage drops by 2-3%, failure detector 112/FDC1 indicates failure and causes de-asserting signal PS1 PWOK and asserting of PS2_ON for the standby power supply PS2. Power supply PS2 transitions into its active state without a delay and maintains the output voltage at terminal Vo within regulation limits. Because of the rapid activation of power supply PS2, and system PWOK logic 180 maintaining high PWOK high during transition time period signal system, PWOK remains in an active state even though power supply PS1 failed.

Figure 5:
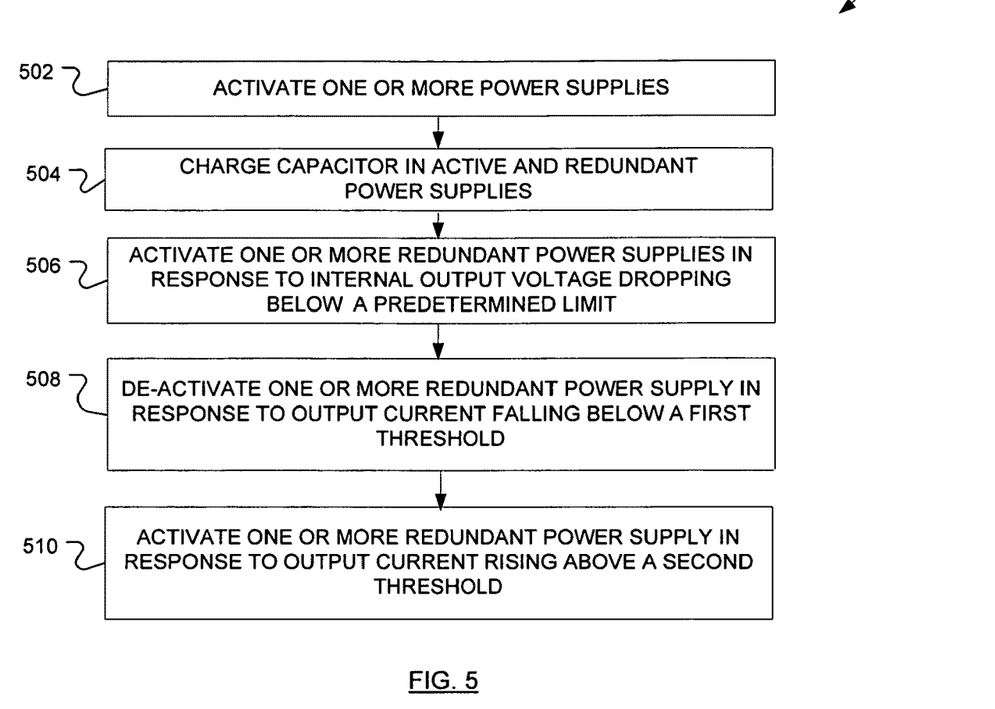
FIG. 5 depicts a flow diagram of a process of managing power output from multiple power supplies, in accordance with an embodiment of the present invention.

FIG. 5 depicts a flow diagram of a process of managing power output from multiple power supplies, in accordance with an embodiment of the present invention. Block 502 may include activating one or more power supplies. For example, an activated power supply may be one or more of power supply PS1 130 of FIG. 1A or power supply PS1 160 of FIG. 1B. Activating a power supply may include enabling soft start of the one or more power supplies.

Block 504 may include charging a capacitor in the active and redundant power supplies. For example, a redundant power supply may be one or more of power supply PS2 140 of FIG. 1A or power supply PS2 170 of FIG. 1B. In the case of PS2 140 of FIG. 1A, charging capacitor 146 may involve using a resistor in parallel with a diode coupled to an output voltage terminal such as the configuration of charging resistor CHR1 144 in parallel with diode 148. In the case of PS2 170 of FIG. 1B, charging capacitor 173 may involve use of charging logic 171 or connection to the output voltage terminal Vo through bypass logic 172.

Block 506 may include activating one or more redundant power supplies in response to the internal output voltage dropping below a predetermined level. For example, the redundant power supply may be power supply PS2 140 and power supply PS2 140 may activate with soft start disabled and using its charged capacitor in response to a voltage at terminal $V_{OL1}$ of power supply PS1 130 falling below a threshold.

Block 508 may include de-activating one or more redundant power supplies in response to the output current falling below a first threshold. For example, a current sensor that measures a current to an output voltage terminal may indicate the output current. De-activating a redundant power supply may reduce energy consumption. The de-activated redundant power supply may be capable to continue to charge its charging capacitor using the output voltage terminal.

Block 510 may include activating one or more redundant power supplies in response to the output current falling below a first threshold. For example, the redundant power supply may be activated with soft start disabled and using its charged capacitor.

Figure 6:
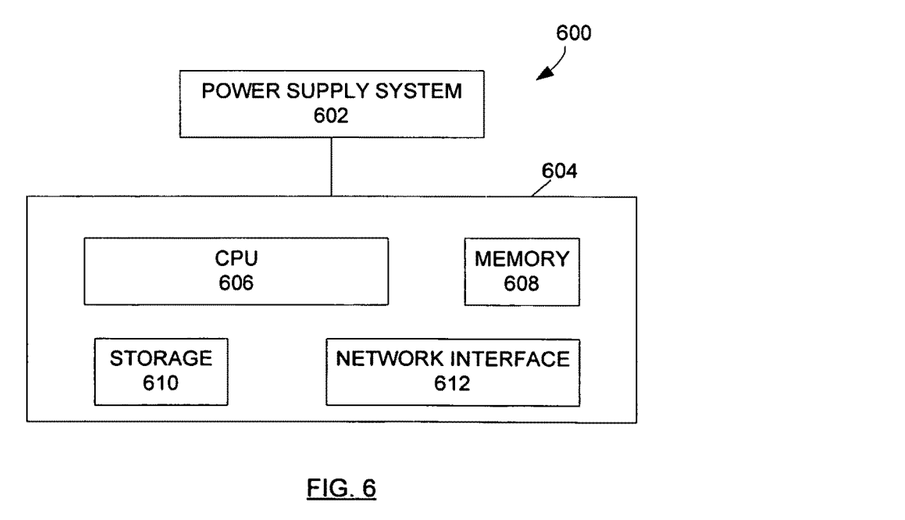
FIG. 6 depicts a system, in accordance with an embodiment of the present invention.

FIG. 6 depicts a system, in accordance with an embodiment of the present invention. System 600 may include a power supply system 602 that supplies power to a computer system 604. Computer system 604 may include a CPU 606, memory 608, storage 610, and network interface 612. Computer system 604 may request powering on of power supply system 602 by transmitting signal PS1_ON. Computer system 604 may receive signal system PWOK from power supply system 602.

In another embodiment (not depicted), fault detection logic may be arranged based on monitoring pulses generated at the HF rectifier output. In another embodiment, output capacitors 136 and 146 are moved to PDL 110.

Charging capacitors could be placed on the PDL similarly to the preloading resistors. In this case, charging resistors are not required, because the capacitors remain charged as long as at least one power supply remains in an active state. Diodes may also be excluded, which would provide cost savings and additional efficiency improvement.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
   a first power supply;
   a second power supply; and
   a power distribution logic comprising an output terminal, wherein
   the power distribution logic is to control which of the first and second power supplies are to output power to the output terminal and
   the power distribution logic is to control whether the second power supply is to start-up using soft start or using a charging capacitor in combination with input voltage pulses having a duty cycle that is approximately constant, wherein the charging capacitor is charged using the output terminal.

2. The apparatus of claim 1, further comprising charging logic to charge the charging capacitor of the second power supply.

3. The apparatus of claim 1, further comprising bypass logic to couple the output terminal to the charging capacitor of the second power supply.

4. The apparatus of claim 1, wherein the power distribution logic comprises:
   failure detection logic to determine an internal voltage of the first power supply.

5. The apparatus of claim 4, wherein
   the failure detection logic is to enable the second power supply in response to determining that the internal voltage of the first power supply is below a first threshold.

6. The apparatus of claim 4, wherein
   the failure detection logic is to enable the second power supply in response to determining that the internal voltage of the first power supply fails to oscillate.

7. The apparatus of claim 1, wherein the power distribution logic further comprises:
   a first comparator to disable the second power supply when the current to the output terminal is below a first threshold.

8. The apparatus of claim 7, wherein
   the first comparator is to enable the second power supply when the current to the output terminal is above a second threshold.

9. The apparatus of claim 1, wherein the power distribution logic further comprises:
   a second comparator to disable soft start of the second power supply in response to an output voltage at the output terminal reaching a nominal level.

10. The apparatus of claim 1, wherein the power distribution logic is to control whether the first power supply starts-up using soft start or using a charging capacitor in combination with input voltage pulses having a duty cycle that is approximately constant.

11. The apparatus of claim 1, wherein the first power supply comprises:
    a capacitor comprising a first terminal;
    a resistor comprising first and second terminals;
    a diode, wherein the diode is coupled in parallel with the resistor and the first terminal of the capacitor is coupled to the first terminal of the resistor.

12. The apparatus of claim 1, wherein the second power supply comprises:
    a capacitor comprising a first terminal;
    a resistor comprising first and second terminals;
    a diode, wherein the diode is coupled in parallel with the resistor and the first terminal of the capacitor is coupled to the first terminal of the resistor.

13. A method comprising:
    providing power to an output terminal using a first power supply and a second power supply;
    charging a capacitor of the second power supply;
    selectively disabling the second power supply in response to current to the output terminal being below a first threshold; and
    selectively enabling the second power supply, wherein enabling the second power supply comprises using the second power supply with soft-start or using a combination of the capacitor and using input voltage pulses having a duty cycle that is approximately constant.

14. A system comprising:
    a computer system; and a power supply system to selectively output power to the computer system, wherein the power supply system comprises:
a first power supply,
a second power supply,
a power distribution logic comprising an output terminal, wherein
the power distribution logic is to control which of the first and second power supplies are to output power to the output terminal and
the power distribution logic is to control whether the second power supply is to start-up using soft start or using a charging capacitor in combination with input voltage pulses having a duty cycle that is approximately constant, wherein the charging capacitor is charged using the output terminal.

15. The system of claim 14, wherein the power distribution logic is to enable the second power supply using a charging capacitor in combination with input voltage pulses having a duty cycle that is approximately constant in response to voltage at the output terminal being below a threshold.

16. The system of claim 15, wherein the power distribution logic is to enable the second power supply using a charging capacitor in combination with input voltage pulses having a duty cycle that is approximately constant in response to voltage at the output terminal being at least a nominal level.

17. The system of claim 14, wherein the power distribution logic is to disable the second power supply in response to current to the output terminal being below a first threshold.

18. The system of claim 14, wherein the power distribution logic is to enable the second power supply using a charging capacitor in combination with input voltage pulses having a duty cycle that is approximately constant in response to current to the output terminal being above a second threshold.

19. The method of claim 13, wherein selectively enabling the second power supply is in response to a voltage at the output terminal being below a threshold.

20. The method of claim 13, wherein selectively enabling the second power supply is in response to current to the output terminal being above a second threshold.

* * * * *